United States Patent Office 3,235,021
Patented Feb. 15, 1966

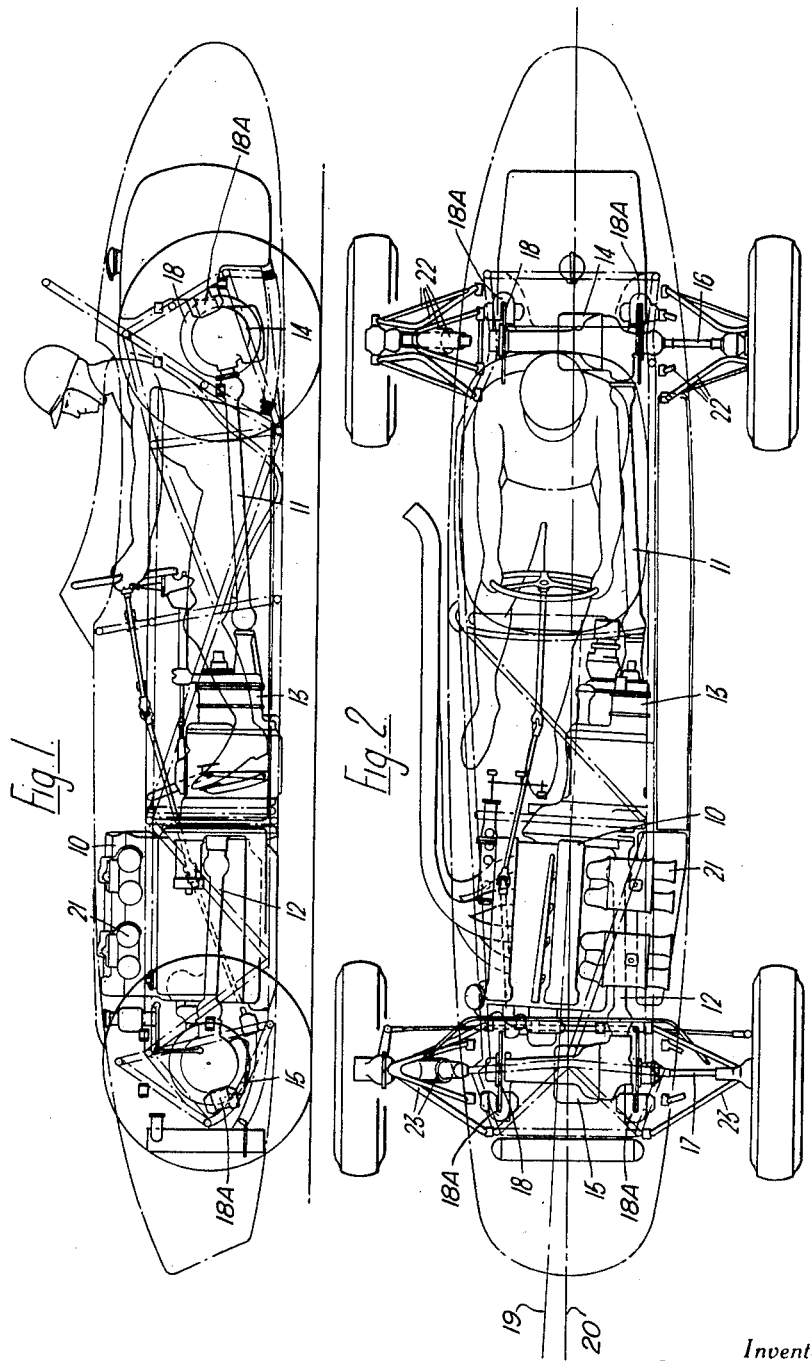

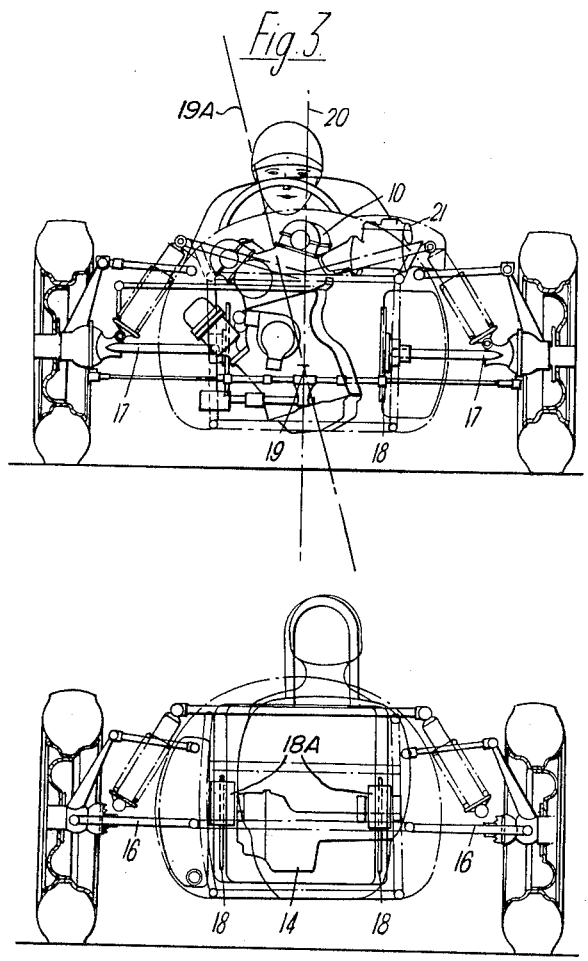

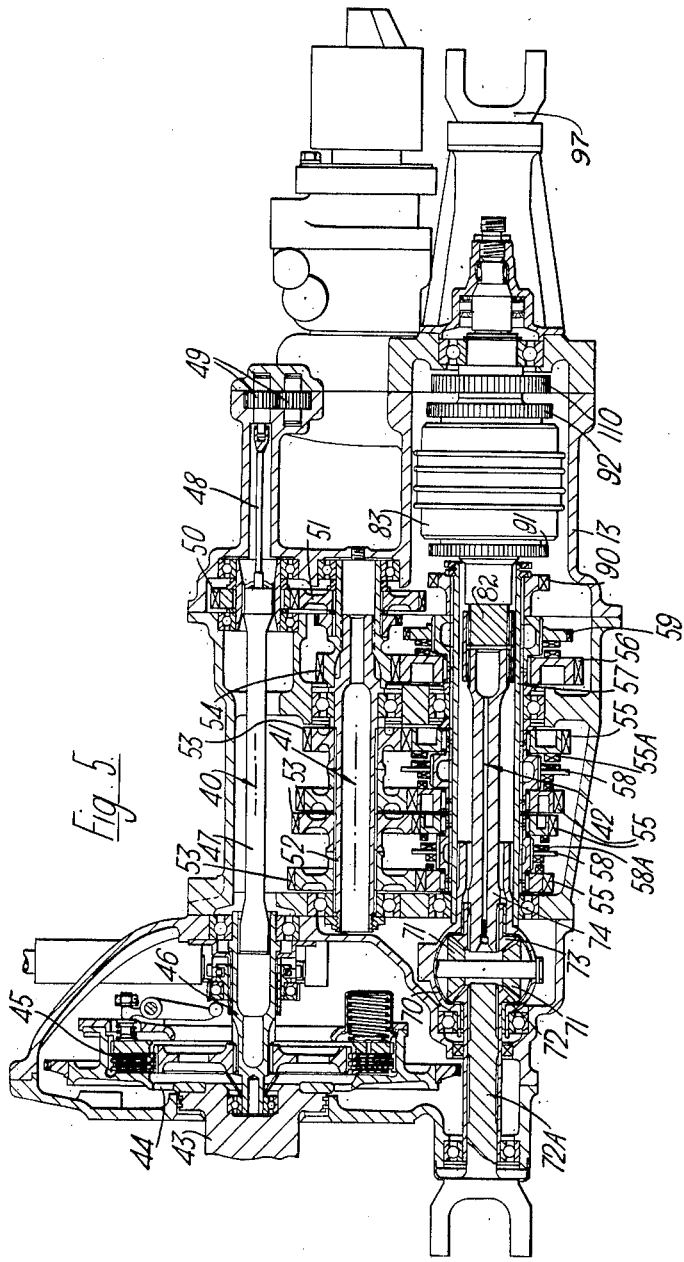

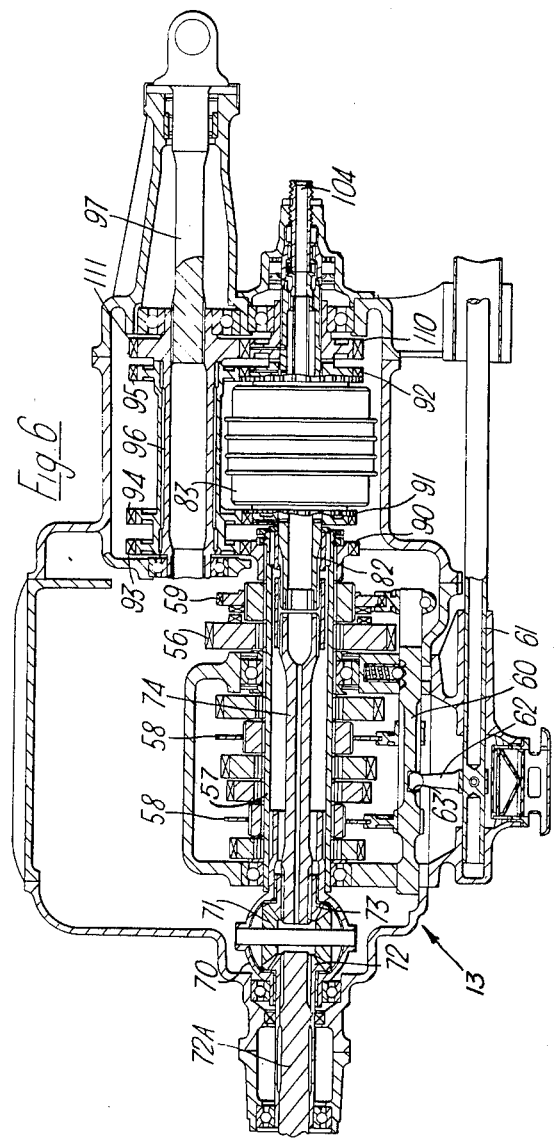

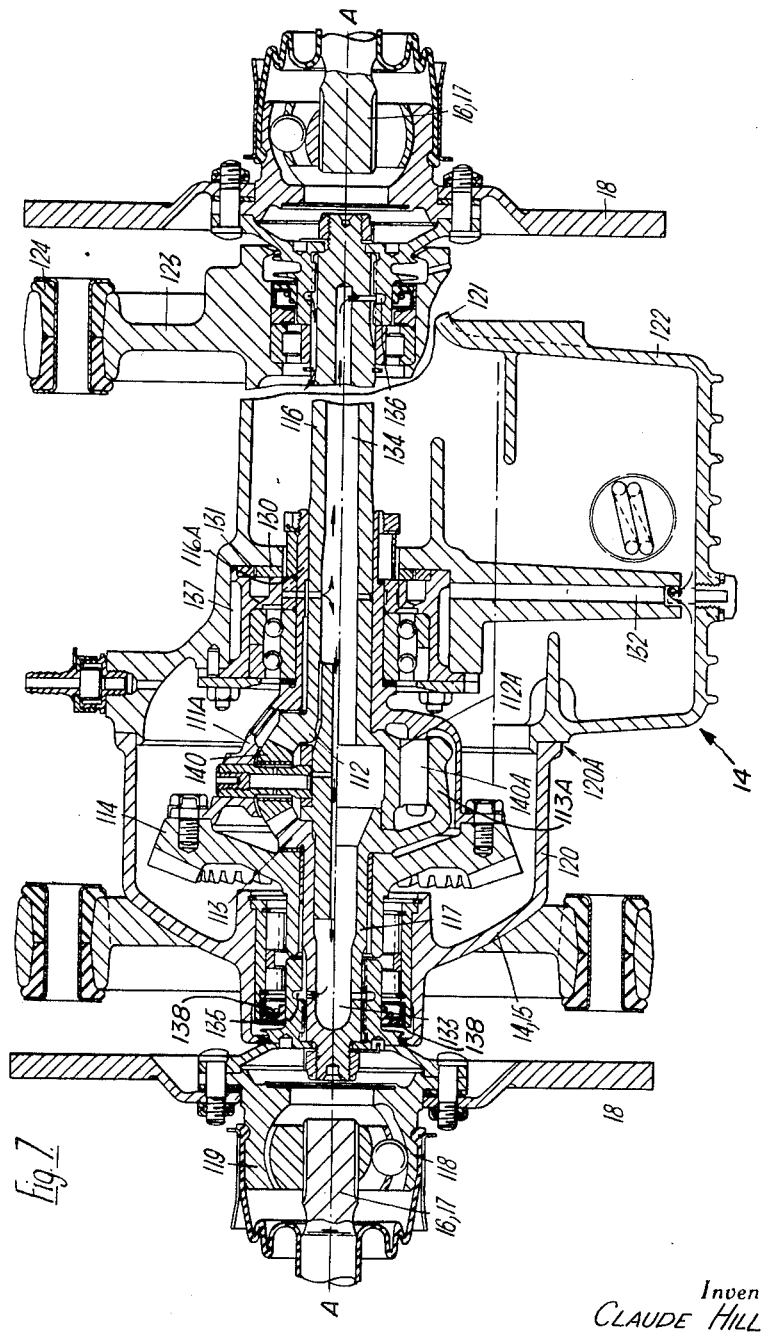

1

3,235,021
RACING MOTOR VEHICLES WITH FOUR WHEEL DRIVE AND CONTROLLED DIFFERENTIAL
Claude Hill, Kenilworth, England, assignor to Harry Ferguson Research Limited, Stow-on-the-Wold, Gloucestershire, England
Filed May 8, 1962, Ser. No. 193,674
Claims priority, application Great Britain, May 13, 1961, 17,508/61
6 Claims. (Cl. 180—44)

This invention relates to high performance motor vehicles, in particular to sports or racing motor vehicles of lightweight construction having a four-wheel drive of the type in which the engine power is divided by a controlled differential between a drive to the rear roadwheels and a drive to the front roadwheels, said drives incorporating a rear differential and a front differential respectively driving rear half-shafts and front half-shafts.

The term "controlled" is used herein to indicate that means are provided for limiting the differential action of the controlled differential gear; that is to say, each of its rear and front output shafts is permitted by the gear to differ in speed from the other output shaft only within predetermined higher and lower limits, the arrangement being such that full freedom for steering is allowed.

The object of the present invention is to provide an improved arrangement by virtue of which a desirable utilization of space, distribution of weight and aerodynamic shape can be achieved, together with enhanced cornering and steering qualities at high speeds.

According to the invention, in a high performance motor vehicle of lightweight construction and having a four-wheel drive of the type stated, a gear case in which a change-speed gear is enclosed, the controlled differential and the means for limiting the differential action thereof are so constructed and arranged in the gear case that the front propeller shaft extends to the front differential past one side of the engine and the rear propeller shaft extends to the rear differential past the same side of the driver's seat.

Seeing that the propeller shafts are both at the same side of the vehicle, in order that the front and rear differentials, the casings containing them and the associated parts, can be wholly or mainly identical, a pair of reversing gearwheels in the gear case are interposed between the rear output of the controlled differential and the rear propeller shaft.

This pair of gearwheels also provide a means of dividing the torque fore and aft in unequal portions, e.g. by "gearing down." That is to say, seeing that the front and rear propeller shafts (under constraint from the front and rear roadwheels) rotate at the same speed, the arrangement is such that the rear output of the controlled differential will rotate faster than the front output, so that the rear propeller shaft will transmit more torque. This arrangement is advantageous under conditions of extreme weight transfer to the rear wheels during acceleration. Because of the torsional balancing effect of this reversal of drive between the rear and front propeller shafts, the engine and gearcase assembly is considerably relieved of torque reaction with respect to its mounting in the chassis frame, thus lessening vibration and stresses.

The change-speed gear may comprise a driving shaft, a lay shaft geared thereto to which forward and reverse driving gearwheels are secured, a tubular output shaft on which are journalled driven gearwheels meshing with the forward gearwheels and a gearwheel driven by the reverse gearwheel, said output shaft being connected to the input component of the controlled differential, clutches for securing any selected one of the driven gearwheels to the output shaft, an internal shaft extending through the tubular output shaft, being co-axial therewith, said internal shaft being connected to the rear output component of the controlled differential and being extended as the central shaft of the differential limiting means, to running and over-running members of which said tubular output shaft and said internal shaft are connected.

Each of the front and rear casings which contain and support the front and rear differentials and support the inner ends of the half-shafts and disc brakes thereon may be formed at each end with a pair of diametrally opposed arms fitted with rubber bushes well spaced apart by which the casing is mounted on the chassis frame. By virtue of the spaced arrangement of these mountings, the casing is well able to withstand acceleration and braking torques.

Each of the front and rear differentials may drive a gear-type oil pump which circulates lubricating and cooling oil throughout the casing and ejects oil on the intermeshing teeth of the crownwheel and the pinion which drives it.

An example of a racing motor vehicle according to the invention is shown in the accompanying drawings in which:

FIGS. 1 and 2 are a side view and a plan of the vehicle and FIGS. 3 and 4 are front and rear end views.

FIGS. 5 and 6 are a nearly horizontal section and a vertical longitudinal section of the controlled differential, the gear case and other associated components.

FIG. 7 is a composite sectional view illustrative of the front and rear differentials, the casings containing them and the associated parts.

Referring to FIGS. 1 to 4, the engine is indicated by 10, the rear and front propeller shafts by 11 and 12, the gear case from which said shafts extend by 13, the casings which contain the rear and front differentials by 14 and 15, the rear and front half-shafts by 16 and 17 and inboard brake discs on the rear and front differential outputs by 18. The "callipers" by which the brake action is applied are indicated by 18a, a calliper being that part of a disc brake which embraces a part of the disc and applies, on application of pressure to the brake pedal, the braking effort to the disc 18. The rear and front propeller shafts 11 and 12 are the outputs of the controlled differential, which is enclosed in the gear case 13 and is not shown in FIGS. 1 to 4.

The vehicle has the following general arrangement features.

The engine is set slightly askew as viewed in plan, the axis 19 of its crankshaft crossing the central vertical longitudinal plane 20 of the vehicle at an angle of about 3° to 5°. As viewed from either end, the engine vertical axis 19a is set to lean at an angle of about 17° to said plane 20. This leaning angularity allows ample room to accommodate the substantial carburettor system, the engine having four carburettors 21.

The components in the gear case 13 are so constructed and arranged that the rear and front differentials, their casings 14 and 15 and associated parts can be identical as between rear and front, one desirable result of which is that the rear suspensions 22 can be precisely symmetrical and the front suspensions 23 also can be precisely symmetrical. As shown, the front propeller shaft 12 is led from the gear case at an upper level alongside the engine where space is provided for the shaft underneath the carburettors 21. The rear propeller shaft 11 is led from the gear case at a low level, inclining upwards alongside the driver's seat to the rear differential 14.

As is customary, each differential has a crown wheel with which meshes a pinion wheel on the associated propeller shaft. Thus, in order that the rear and front differentials can be identical, it is essential that the propeller shafts 11 and 12 shall be rotated in opposite directions, and accordingly the shaft 11 is reversed by appropriate gears enclosed in the gear case.

The general arrangement is such that the engine, gear case and steering gear towards the front slightly outweigh the driver whose weight is towards the rear, and the fuel tanks and associated parts, thus ensuring that the greater portion of the total weight will be borne by the front roadwheels, which is beneficial for stability and control at high speeds.

Moreover, despite the additional mechanism required for a four-wheel drive with full differentiation between the front and rear pairs of roadwheels and amongst the four roadwheels, as opposed to a conventional rear or front two-wheel drive, the general arrangement is equally compact and allows as much space as is customary for the accommodation of the driver.

FIGS. 5 and 6 show the construction and arrangement of the components in the gear case 13 by virtue of which the advantageous general arrangement according to FIGS. 1 to 4 is achieved.

The gear-case components include a four-speed and reverse change speed gear of simple, compact and robust construction.

In FIG. 5 the crankshaft axis is indicated by 40 and the main axis of the change-speed gear by 41 and 42. The crankshaft 43 drives through a flywheel-and-clutch assembly 44, 45 a clutch shaft 46 which is splined to a driving shaft 47 with an extension quill shaft 48 which drives an oil-lubrication pump 49. The driving shaft 47 has secured to it one of a matching pair of gearwheels 50, 51. These gearwheels are readily detachable and interchangeable with other pairs of gearwheels giving different speed-reduction ratios. The gearwheel 51 is secured to the lay shaft 52 of the gear, this shaft having the axis 41. There are secured to the lay shaft four forward gearwheels 53 and a reverse gearwheel 54. The forward gearwheels respectively mesh with matching gearwheels 55 and the reverse gearwheel 54 engages through an idler wheel (not shown) with a matching gearwheel 56, the gearwheels 55, 56 being all journalled to rotate freely on the output shaft 57 of the gearcase, which shaft has the axis 42. The gearcase includes two forward clutches 58 with dog-teeth 58A on their opposite faces, these clutches being each slidable between two of the gearwheels 55 and their dog-teeth being engageable with complementary dog-teeth 55A on the gear wheels. A reverse clutch 59 is correspondingly engageable with the gearwheel 56. The clutches 58, 59 are respectively carried by three slide bars 60, any selected one of which can be engaged by a driver-controlled gear lever mechanism including a rotatable and lengthwise slidable rod 61 with an arm 62 that is engageable with a notch 63 in the selected slide bar 60. The arrangement, as is usual, is such that the driver can clutch any selected one of the five gear wheels 55, 56 to the output shaft 57.

The gear case 13 also encloses the controlled differential. This comprises a planet-carrier 70, which is the input component, planets 71 and two diametrally opposed front and rear sunwheels 72, 73, which are the output components. The planet-carrier 70 is secured to the gear-output shaft 57, which is a hollow sleeve. The front sunwheel 72 is secured to the front propeller shaft 12 through the front output shaft 72A of the differential. The rear sunwheel 73 is scured to a shaft 74, which is the differential rear output shaft. This shaft 74 has applied to it the means for limiting the differential action as indicated at 83. The specific construction of this limiting means is not part of the present invention and is not illustrated in detail in the accompanying drawing, but such means is illustrated and described in patent application Serial No. 218,267. Briefly, the limiting means of the above application comprises a pair of clutches each including two positively driven members, namely a running member and an over-running member, the arrangement being such that as regards one clutch its running member, a shaft 82, rotates with the rear output shaft 74 of the differential, as FIG. 6 shows, and its over-running member rotates with the differential input, namely the shaft 57, whereas as regards the other clutch its running member rotates with the differential input 57 and its over-running member is the same shaft 82, which rotates with the differential output shaft 74. The shaft 82 incorporating running and over-running members of the two clutches is the central shaft of the differential-limiting means.

The differential-limiting means includes three gearwheels 90, 91 and 92 which mesh respectively with integral control gearwheels 93, 94 and 95 journalled on a sleeve shaft 96, through which extends and to which is secured the rear output shaft 97 of the gear case 13 to which shaft 97 the rear propeller shaft 11 is jointed.

In a transmission mechanism of the construction described it is essential, for reverse driving and other purposes, that both clutches shall be disabled, i.e. rendered ineffective as clutches. The specific disabling means is not part of the present invention and is not illustrated in the accompanying drawings. Briefly, the pair of clutches are associated with a pair of pressers applicable to the friction clutches, each friction clutch and presser being interposed between the associated running and over-running clutch members and the presser having a connection with one of these members to permit a limited amount of relative rotational and axial motion between them, a pair of abutments between each of which and the associated presser the friction clutch is interposed and which co-operate with the pressers on the friction clutches during forward driving to limit the differenitial action, and a mechanical control device which normally supports the abutments in an operative position but which is movable by a control rod 104 to withdraw its support and thereby disable the clutches. Such clutch-disabling means is described in the specification of patent application Serial No. 218,267.

As previously stated, the propeller shafts 11 and 12 are rotated in opposite directions. Accordingly, a pair of reversing gearwheels 110, 111 connect the differential rear output shaft 74 through its extension shaft 82 to the rear output shaft 97 of the gear case. These gearwheels are devised to serve an additional purpose, namely to divide in unequal proportions the torque transmitted to the front and rear roadwheels of the vehicle. Thus, the wheel 110 is smaller than the wheel 111 so that the shaft 74 will rotate faster than the rear shaft 97 driving the rear propeller shaft 11 which, during normal straight-ahead driving, will rotate at the same speed as the front propeller shaft 12 under the constraint of the front and rear roadwheels. This provision for different speeds of the controlled-differential output shafts 74 and 72A means that differential action will continuously occur during straight-ahead driving. The effect is that a greater proportion of the driving torque will be transmitted to the rear roadwheels, and this has various advantages to high performance vehicles.

Referring to FIG. 7, the portion of this composite view above the transverse central line A—A is in plan, whereas the portion below the line A—A is in vertical section. Moreover, the view illustrates both the rear and front differentials, their enclosing casings 14, 15 and associated parts. The propeller shaft 11 or 12, the inner ends of the half-shafts 16 or 17 and the inboard brake discs 18 are shown. The differential comprises as its input component a planet carrier 111A and as its output components a pair of sunwheels 112, 113. The carrier 111A is secured to a crownwheel 114 which meshes as is customary with a pinion (not shown) on the assocaited propeller shaft 11 or 12. The sunwheels have extension shafts 116, 117 to which are splined rotary assemblies of parts including the brake discs 18 and an element 118 of the inner universal joint 119 of the half-shaft 16 or 17.

The casing 14 or 15 consists chiefly of two castings 120, 121, the latter of which is considerably longer; it includes an oil sump 122. The castings are joined together at 120A. The mountings by which the casing is carried at each end are fitted to a pair of diametrally opposed arms both integral with the associated casting 120 or 121. Only one of these arms is shown, being indicated by 123. The arms extend fore and aft horizontally, or as nearly horizontally as is practicable. The end of each of these arms is formed with a hollow boss into which are fitted a pair of mounting bushes 124 composed of rubber or like shock-absorbing material. The four bushes fitted to the two pairs of arms are secured to mounting brackets on the chassis frame of the vehicle. It will be apparent that the mountings by which each pair of diametrally opposed arms are carried are well spaced apart. Moreover, these mountings and their arms are located close to callipers (18a, FIGS. 1 and 2) applied to the brake discs 18. Accordingly, these mountings relieve the differential casing, especially the long casting 121, of the heavy brake torque reaction stress. The mountings are also well able to withstand driving torque reaction stress.

The casing 14 or 15 also encloses an oil pump. This pump is of type comprising an inner rotor and an outer rotor, these rotors being toothed externally and internally, respectively. The rotors are indicated by 130, 131. The inner rotor 130 is keyed to, so as to be driven by, the extension shaft 116A of the differential carrier 111a. Oil is sucked by the pump from the sump 122 by way of a conduit 132 and is discharged to axial bores 133, 134 through the shafts 116, 117 to annular passages 135, 136 near the seals 138 at opposite ends of the casing. The oil exercises a cooling influence on the seals, which are in a vulnerable position as regards failure due to overheating because of their proximity to the brakes and which if they failed would pass oil as mist to the brakes to the great detriment of braking power and balance. The pump also discharges oil to a conduit 137 leading through the castings 121, 120 to a point where it is ejected as lubricant upon the teeth of the gearwheel 114 and the input pinion to the differential 14 or 15, where they inter-mesh.

The oil system may include a spring-urged relief valve (not shown) of any known type which opens automatically to discharge the oil in the event that its pressure becomes excessive.

In the example, the total assembly comprising the differential casing, the parts which it contains and the parts with which it is associated at the rear is identical with the total assembly at the front, with one exception referred to below. In order that such identical assemblies can be used, the boltholes of the joint at 120A are so arranged that the casting 120 can be jointed to the casting 121 in either of two positions approximately 180° apart, in each of which the sump 122 is underneath. The exception to complete identity, in the example, is that the front differential is of conventional construction, giving free differential action, whereas the rear differential is of so-called "stiff" construction, its freedom to differentiate being restricted. Thus, in the example, the front differential has toothed planet wheels 140, one of which is shown, with correspondingly toothed sunwheels 112, 113. On the other hand, the rear differential is of the type known as "Z. F. Differential" in which the "planets" are rollers 140A engaged between lobes in internal and external "sunwheels" 112A, 113A, the arrangement being such that the wheel 113A has one more lobe than the wheel 112A.

I claim:
1. A high performance racing motor vehicle having a driving engine and a crankshaft, front and rear pairs of ground wheels, front and rear axle differentials, a four-wheel drive comprising in combination, a speed change and reversing transmission so mounted to be in an offset relation with the longitudinal center line of the vehicle, a front output shaft and a rear output shaft mounted for rotation within said transmission, a controlled differential having input and output portions and drivingly connecting said front output shaft and said rear output shaft, means for limiting the differential action of said controlled differential, a front propeller shaft drivingly interconnecting said front output shaft and said front pair of wheels disposed substantially at the level of the axis of said front pair of wheels and extending closely along one side of said engine, a rear propeller shaft drivingly interconnecting said rear output shaft and said rear pair of wheels and extending alongside the same side of said vehicle as said front propeller shaft.

2. A high performance racing motor vehicle according to claim 1 wherein said transmission includes a pair of intermeshing reversing gearwheels, the first of said reversing gearwheels being mounted in conjunction with the rear output shaft of said controlled differential and the second of said reversing gearwheels being mounted upon said rear propeller shaft whereby the rear propeller shaft rotates in a direction opposite that of said front propeller shaft.

3. A high performance racing motor vehicle according to claim 2 wherein said second reversing gearwheel has a greater diameter than said first reversing gearwheel whereby the rear output shaft rotates at a speed greater than the front output shaft thereby imparting more torque to said rear wheels than is transmitted to said front wheels.

4. A high performance racing motor vehicle according to claim 3 wherein said transmission further comprises a driving shaft adapted to be connected to said crankshaft, a lay shaft, gear means connecting said driving shaft and said lay shaft, forward and reversing driving gears secured to said lay shaft, a tubular driven shaft, forward and reversing driven gears journaled on said tubular driven shaft and adapted to mesh with said forward and reversing driving gears, said tubular driven shaft being connected to said input portion of the controlled differential, clutch means adapted to secure selected forward or reversing gears to said tubular driven shaft, an internal shaft member being coaxial with and extending through said tubular driven shaft, said internal shaft having one end connected to said output portion of the controlled differential and the other end connected to said differential limiting means whereby the differential limiting means is so arranged as to permit the speed of the front and rear output shafts to differ only by a predetermined amount.

5. A high performance racing motor vehicle according to claim 4 wherein said front and rear axle differentials have a pair of diametrically opposed mounting arms integrally associated therewith and extending outwardly therefrom, an aperture in each of said arms at the extreme end thereof, a rubber bushing associated with said aperture in each of said arms whereby said front and rear axle differentials are adapted to be mounted by said arms securely to the chassis of said motor vehicle.

6. A high performance racing motor vehicle according to claim 5 including an oil pump mounted within each of said front and rear differentials and driven by said differentials, passageways associated with said oil pump whereby said oil pump circulates oil within said differentials.

References Cited by the Examiner
UNITED STATES PATENTS

| | | | |
|---|---|---|---|
| 838,604 | 12/1906 | Bard | 180—44 |
| 1,240,551 | 9/1917 | Farrell | 180—44 X |
| 2,071,537 | 2/1937 | Keese | 180—44 |
| 2,206,342 | 7/1940 | Wiebicke | 180—49 |
| 2,232,154 | 2/1941 | Wagner | 180—70 |
| 2,296,205 | 9/1942 | Johnson | 180—54 X |
| 2,392,832 | 1/1946 | Buckendale | 180—44 |
| 2,915,133 | 12/1959 | Kraus | 180—44 |
| 2,959,237 | 11/1960 | Hill | 180—44 |

A. HARRY LEVY, *Primary Examiner.*